US012802495B2

(12) United States Patent
Naserian et al.

(10) Patent No.: US 12,802,495 B2
(45) Date of Patent: Nov. 17, 2026

(54) DRIVER-DEFINED VEHICLE TO VEHICLE COMMUNICATION

(71) Applicant: GM Global Technology Operations LLC, Detroit, MI (US)

(72) Inventors: Mohammad Naserian, Windsor (CA); Feiyu Cong, Shanghai (CN); Jie Zhu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 384 days.

(21) Appl. No.: 18/501,154

(22) Filed: Nov. 3, 2023

(65) Prior Publication Data

US 2025/0124746 A1 Apr. 17, 2025

(30) Foreign Application Priority Data

Oct. 13, 2023 (CN) ........................ 202311332923.2

(51) Int. Cl.
*G07C 5/00* (2006.01)

(52) U.S. Cl.
CPC .................................... *G07C 5/008* (2013.01)

(58) Field of Classification Search
CPC ..................................................... G07C 5/008
See application file for complete search history.

(56) References Cited

U.S. PATENT DOCUMENTS

| | | | | |
|---|---|---|---|---|
| 2014/0333201 A1* | 11/2014 | Foltin | B60Q 1/1423 315/82 |
| 2018/0365993 A1 | 12/2018 | Makke et al. | |
| 2019/0096144 A1* | 3/2019 | Noh | H04W 12/66 |
| 2020/0001870 A1* | 1/2020 | Saigusa | B60W 50/04 |
| 2021/0009027 A1* | 1/2021 | Mulligan | B60Q 1/14 |
| 2021/0213873 A1* | 7/2021 | Martin | B60Q 1/143 |
| 2022/0171382 A1* | 6/2022 | Austria | G05D 1/0022 |

FOREIGN PATENT DOCUMENTS

DE 102021118989 A1 1/2023

* cited by examiner

*Primary Examiner* — Anne Marie Antonucci
*Assistant Examiner* — Jewel A Kuntz
(74) *Attorney, Agent, or Firm* — Vivacqua Crane, PLLC

(57) ABSTRACT

A method for driver-defined vehicle to vehicle communications includes receiving, by a controller of a host vehicle, remote-vehicle data from a plurality of remote vehicles. The method also includes identifying, by the controller of the host vehicle, at least one V2X-capable remote vehicle of the plurality of remote vehicles using the remote-vehicle data. The V2X-capable remote vehicle is capable of receiving and transmitting V2X communications. The method also includes receiving, by a user interface of the host vehicle, an input from a vehicle occupant of the host vehicle in response to identifying at least one V2X-capable remote vehicle. The input is indicative that the vehicle occupant wants to communicate a prerecorded voice message to V2X-capable remote vehicle. The method also includes transmitting the prerecorded voice message to the at least one V2X-capable remote vehicle in response to receiving the input from the vehicle occupant.

20 Claims, 5 Drawing Sheets

DRIVER-DEFINED VEHICLE TO VEHICLE COMMUNICATION

INTRODUCTION

The present disclosure relates to methods and systems for driver-defined vehicle to vehicle communications.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

While a vehicle is in motion, it is sometime desirable to convey information to another vehicle. While mobile phones may be used to exchange information between vehicles if the vehicle occupants of different vehicle know each other's contact information, the vehicle occupants' contact information is often not known. Therefore, it is desirable to develop a method and systems for facilitating vehicle to vehicle communication.

SUMMARY

The present disclosure describes a method for driver-defined vehicle to vehicle communications. In an aspect of the present disclosure, the method includes receiving, by a controller of a host vehicle, remote-vehicle data from a plurality of remote vehicles. Each of the plurality of remote vehicles is located within a predetermined distance from the host vehicle. The remote-vehicle data includes information relating to which of the plurality of remote vehicles is configured to receive and transmit vehicle-to-everything (V2X) communications. The method also includes identifying, by the controller of the host vehicle, at least one V2X-capable remote vehicle of the plurality of remote vehicles using the remote-vehicle data. The V2X-capable remote vehicle is capable of receiving and transmitting V2X communications. The method also includes receiving, by a user interface of the host vehicle, an input from a vehicle occupant of the host vehicle in response to identifying at least one V2X-capable remote vehicle. The input is indicative that the vehicle occupant wants to communicate a prerecorded voice message to V2X-capable remote vehicle. The method also includes transmitting the prerecorded voice message to the at least one V2X-capable remote vehicle in response to receiving the input from the vehicle occupant. Other embodiments of this aspect include corresponding computer systems, apparatus, and computer programs recorded on one or more computer storage devices, each configured to perform the actions of the methods.

Implementations may include one or more of the following features. The method may include broadcasting a service announcement message to the plurality of remote vehicles. The service announcement message indicates that the host vehicle supports V2X communications. The input from the vehicle occupant may be a voice command from the vehicle occupant. The user interface of the host vehicle includes a microphone configured to receive the voice command from the vehicle occupant. The user interface includes a touchscreen, and the input from the vehicle occupant occurs when the vehicle occupant touches the touchscreen. The input may include a selection of one or more of the plurality of V2X-capable remote vehicles. The input may include a selection of one or more of the plurality of prerecorded voice messages. The plurality of prerecorded voice messages is shown in a dropdown menu presented on the display of the host vehicle. The V2X-capable remote vehicle plays the prerecorded voice message in response to receiving the prerecorded voice message from the host vehicle. The method may include receiving a voice reply from the at least one V2X-capable remote vehicle to the prerecorded voice message. Implementations of the described techniques may include hardware, a method or process, or computer software on a computer-accessible medium.

In another aspect of the present disclosure, the method includes detecting that a high-beam headlight of a remote vehicle that is moving toward a host vehicle is turned on and transmitting a message to the remote vehicle in response to detecting that the high-beam headlight of the remote vehicle that is moving toward the host vehicle is turned on. The message includes a request that the high-beam headlight of the remote vehicle be turned off. Other embodiments of this aspect include corresponding computer systems, apparatus, and computer programs recorded on one or more computer storage devices, each configured to perform the actions of the methods.

Implementations may include one or more of the following features. The method may include automatically turning off the high-beam headlight of the remote vehicle in response to receiving the message requesting that the high-beam headlight be turned off. The method may include determining a luminous intensity of the high-beam headlight of the remote vehicle that is moving toward the host vehicle, comparing the luminous intensity of the high-beam headlight of the remote vehicle that is moving toward the host vehicle with a predetermined intensity threshold to determine whether the luminous intensity of the high-beam headlight of the remote vehicle that is moving toward the host vehicle is greater than the predetermined intensity threshold, and transmitting the message to the remote vehicle in response to determining that the luminous intensity of the high-beam headlight of the remote vehicle that is moving toward the host vehicle is greater than the predetermined intensity threshold. The high-beam headlight of a plurality of high-beam headlights. Each of the plurality of remote vehicles includes one or more high-beam headlights. The method includes transmitting the message to the remote vehicle includes broadcasting to the plurality of remote vehicles. The method further may include determining, by each of the plurality of remote vehicles, whether the message broadcasted by the host vehicle individually applies to each of a corresponding one of the plurality of remote vehicles to determine a target remote vehicle. The target remote vehicle solely sends an in-cabin notification requesting that the plurality of high-beam headlights be turned off. The target remote vehicle automatically turns off the plurality of high-beam headlights in response to receiving the message broadcasted by the host vehicle. Implementations of the described techniques may include hardware, a method or process, or computer software on a computer-accessible medium.

The present disclosure also described a system for driver-defined vehicle to vehicle communications. In an aspect of the present disclosure, the system includes a user interface, a transceiver, and a controller in communication with the user interface and the transceiver. The controller is programmed to execute any of the methods described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 6 is a schematic diagram of a remote vehicle moving toward the host vehicle of FIG. 1, wherein the high-beam headlights of the remote vehicle are on.

DETAILED DESCRIPTION

Figure 1:
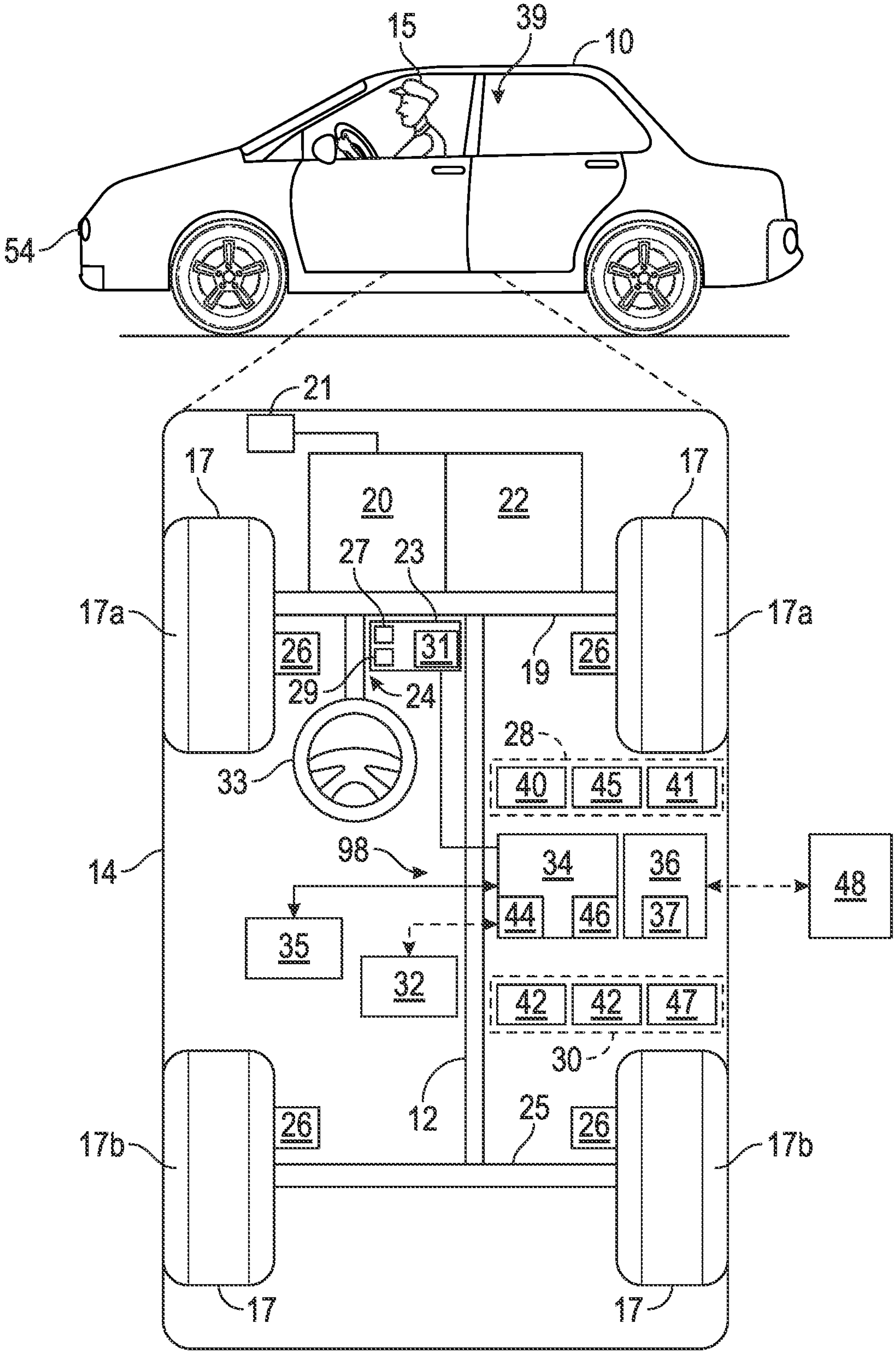
FIG. 1 is a block diagram depicting a host vehicle including a system for driver-defined vehicle to vehicle communications.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a chassis 12, a vehicle body 14, front and rear wheels 17 and may be referred to as a vehicle system. In the depicted embodiment, the host vehicle 10 includes two front wheels 17*a* and two rear wheels 17*b*. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17*a* and a rear axle 25 coupled to the rear wheels 17*b*.

In various embodiments, the host vehicle 10 may be an autonomous vehicle, and a control system 98 is incorporated into the host vehicle 10. The control system 98 may be referred to as the system or the system for driver-defined vehicle to vehicle communications. The host vehicle 10 is, for example, a vehicle that is automatically controlled to carry passengers (e.g., vehicle occupant 15) from one location to another. The host vehicle 10 may be configured as a truck, sedan, coupe, sport utility vehicle (SUV), recreational vehicles (RVs), etc. In an embodiment, the host vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the host vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences the position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the controller 34 and may include, but are not limited to, one or more radars, one or more light detection and ranging (LIDAR) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more cameras 41, one or more gyroscopes, one or more accelerometers, one or more inclinometers, one or more speed sensors, one or more three-dimensional (3D) depth sensor 45, one or more ultrasonic sensors, one or more inertial measurement units (IMUs), thermal imaging sensors, one or more microphones 31 and/or other sensors. Each sensor 40 is configured to generate a signal that is indicative of the sensed observable conditions (i.e., sensor data) of the exterior environment and/or the interior environment of the host vehicle 10. Because the sensor system 28 provides sensor data to the controller 34, the sensor system 28 and its sensors 40 are considered sources of information (or simply sources).

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the controller 34, reroute from the controller 34, or part of the controller 34 and part of a reroute system.

The host vehicle 10 may further include one or more airbags 35 in communication with the controller 34 or another controller of the host vehicle 10. The airbag 35 includes an inflatable bladder and is configured to transition between a stowed configuration and a deployed configuration to cushion the effects of an external force applied to the host vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the host vehicle 10. The controller 34 of the host vehicle 10 may be referred to as a vehicle controller and may be programmed to execute a method 100 (FIG. 5) and/or a method 200 (FIG. 6) as described in detail below.

The instructions may include one or more reroute programs, each of which comprises an ordered listing of executable instructions for implementing logical functions. The instructions, when executed by the processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single controller 34 is shown in FIG. 1, embodiments of the host vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the host vehicle 10. In various embodiments, one or more instructions of the controller 34 are embodied in the control system 98.

The host vehicle 10 includes a user interface 23, which may be a touchscreen 43 (FIG. 3) in the dashboard. The user interface 23 may include, but is not limited to, an alarm, such as one or more speakers 27 to provide an audible sound, haptic feedback in a vehicle seat or other object, one or more displays 29, one or more microphones 31 (e.g., a microphone array) and/or other devices suitable to provide a notification to the vehicle user of the host vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a person (e.g., vehicle occupant 15). Accordingly, the controller 34 is configured to receive inputs from the user via the user interface 23. While the microphone 31 is shown in FIG. 1 as part of the user interface 23, other microphones 31 may be part of the sensor system 28. The microphones 31 is configured to capture voice commands from vehicle occupants 15 in the passenger compartment 39 of the host vehicle 10. It is envisioned, however, that the microphones 31 may be coupled to other parts of the host vehicle 10. Regardless of its exact location, the microphones 31 is in communication with the controller 34. Accordingly, the microphone 31 may send sensor data (e.g., voice commands) to the controller 34.

The host vehicle 10 may include one or more displays 29 configured to display one or more images as described below. For instance, the display 29 may be configured to present information to one or more vehicle occupant 15 inside the passenger compartment 39 of the host vehicle 10. The display 29 is in communication with the controller 34. Accordingly, the controller 34 is configured to control the operation of the display 29.

The communication system 36 is in communication with the controller 34 and is configured to wirelessly communicate information to and from other entities, such as the remote vehicles 48 using, for example, Vehicle-to-everything (V2X) technology. As non-limiting examples, the communication system 36 may transmit and/or receive information from other vehicles ("V2V" communication), infrastructure ("V21" communication), remote systems at a remote call center (e.g., ON-STAR by GENERAL MOTORS) and/or personal electronic devices, such as a mobile phone. Some of the remote vehicles 48 may be also configured to wirelessly communicate information to and from other entities, such as the remote vehicles 48 using, for example, V2X technology. In the present disclosure, the remote vehicles 48 that are capable of wirelessly communicate information to and from other entities, such as the remote vehicles 48, are referred to as V2X-capable remote vehicles. The remote vehicles 48 may include all or some of the components of the host vehicle 10. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the host vehicle 10 and another vehicle (a remote vehicle 48). Further, the communication system 36 is configured to wirelessly communicate information between the host vehicle 10 and infrastructure.

As described in detail below, the system 98 is configured for driver-defined vehicle to vehicle communications. For example, by using the system 98, the vehicle occupant 15 of the host vehicle may send messages to the remote vehicles 48, such as "turn off your high-beam headlights", "you are in reverse", "thank you" and/or "sorry". The system 98 allows the vehicle occupant 15 to send two types of messages to the occupant of the remote vehicles 48. First, the system 98 enables the vehicle occupant 15 to broadcast periodic messages, which may be customized for the particular vehicle occupant 15 through, for example, the user interface 23. These broadcasted messages may include notifications, such as "Student Driver", "Elderly Driver", "baby on board". The messages may be transmitted (i.e., broadcasted) to all the V2X-capable remote vehicles 48 and includes the location of the host vehicle 10. The system 98 also allows the vehicle occupant 15 of the host vehicle 10 to transmit non-periodic messages in a unicast fashion. In this case, the vehicle occupant 15 may select the destination and the type of message through the user interface 23.

Figure 2:
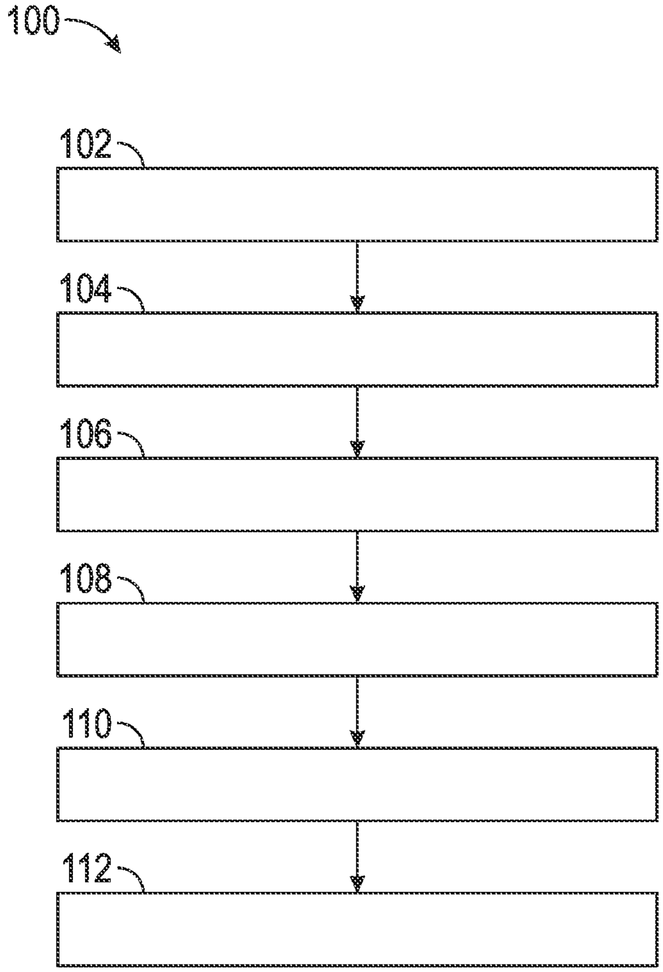
FIG. 2 is a method for driver-defined vehicle to vehicle communications.
Figure 3:
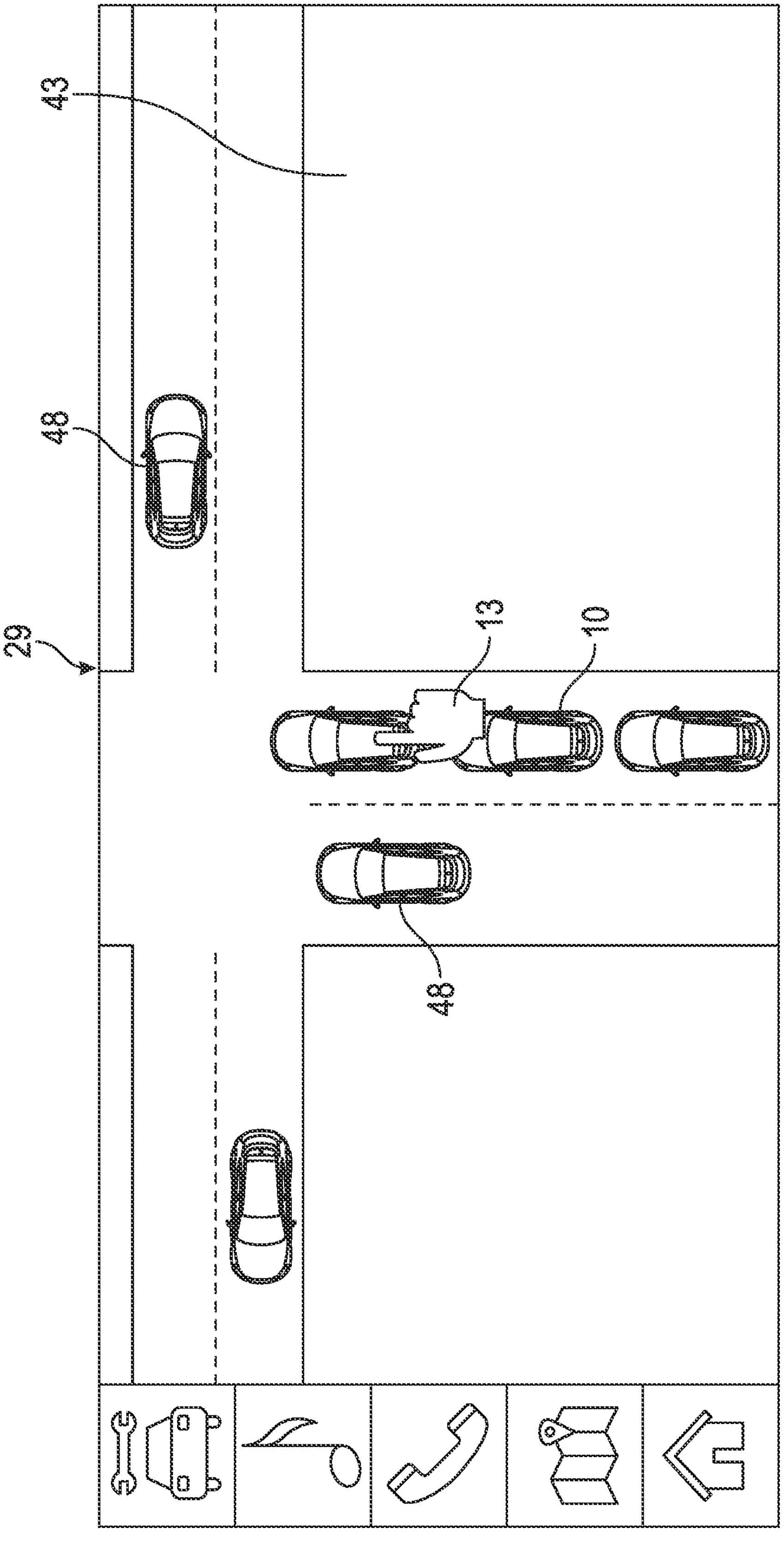
FIG. 3 is a front view of a display of the vehicle of FIG. 1, wherein the display includes a touchscreen.
Figure 4:
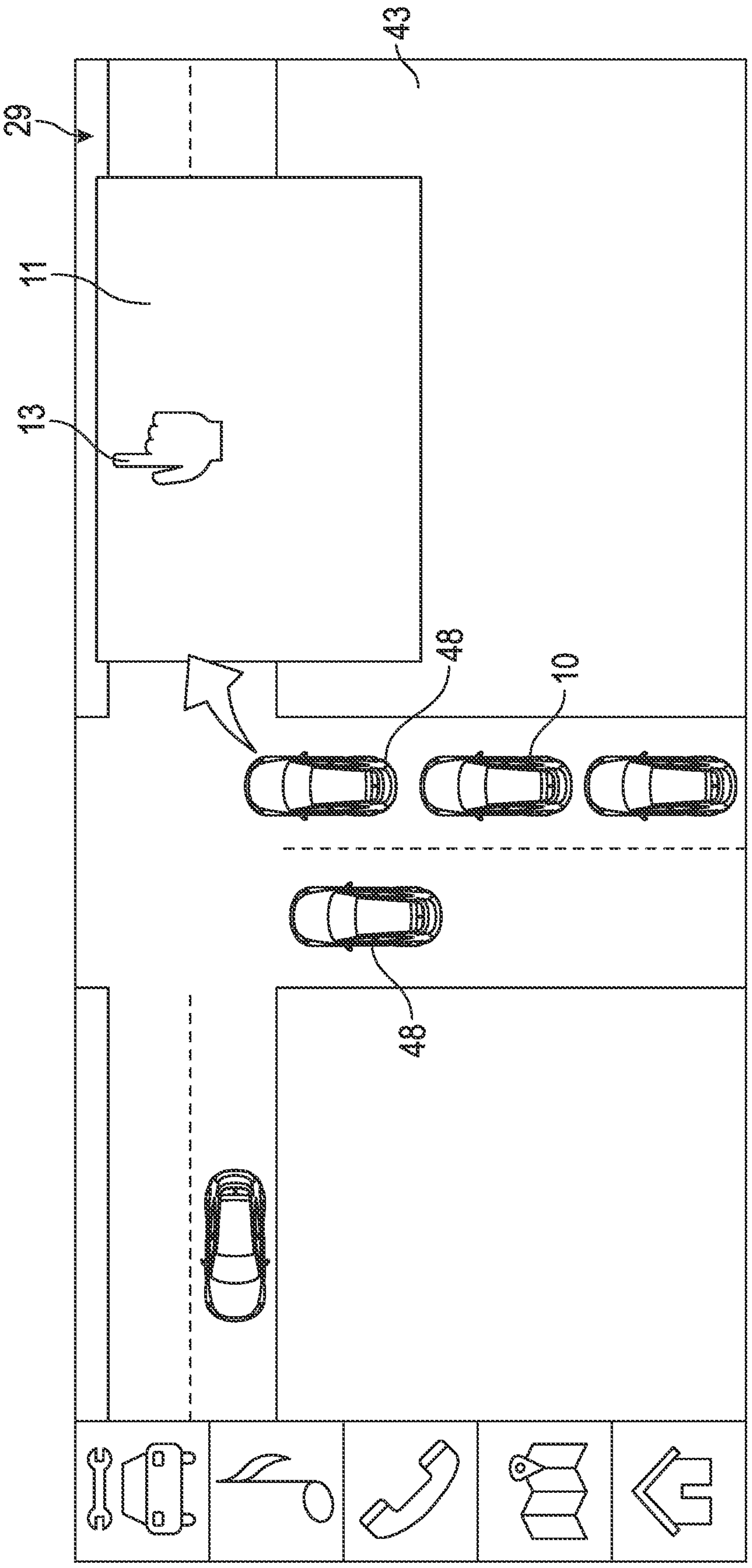
FIG. 4 is a front view of the display of FIG. 2, depicting a pulldown menu with a list of prerecorded voice messages.

With reference to FIGS. 2, 3, and 4, a method 100 for driver-defined vehicle to vehicle communications is disclosed. The method 100 begins at block 102. At block 102, the controller 34 commands the communication transceiver 37 to broadcast a service announcement to all the remote vehicles 48 that are within a communication range of the V2X (i.e., predetermined distance from the host vehicle 10). The communication range may be, for example, five hundred meters from the host vehicle 10. In other words, using V2X technology, the host vehicle 10 broadcasts the service announcement. The service announcement message indicates that the host vehicle 10 supports V2X communications.

Further, at block 102, the controller 34 of the host vehicle 10 receives remote-vehicle data from the remote vehicles 48 that are located within a predetermined distance (e.g., five hundred meters) from the host vehicle 10. The remote-vehicle data includes information relating to which of remote vehicles 48 is configured to receive and transmit Vehicle-to-Everything (V2X) communications (i.e., the V2X-capable remote vehicles 48). Using the remote-vehicle data, the controller 34 of the host vehicle 10 identifies the V2X-capable remote vehicles 48 that are located within the predetermined distance from the host vehicle 10. As discussed above, V2X-capable remote vehicles 48 are capable of receiving and transmitting V2X communications. Then, the method 100 continues to block 104.

At block 104, the controller 34 creates and maintains a list of the V2X-capable remote vehicles 48. As shown in FIG. 3, the display 29 of the user interface 29 may show a map, an icon representing the host vehicle 10, and multiple icons representing the V2X-capable remote vehicles 48. For instance, the display 29 may show all the remote vehicles 48 but highlights (using, for example, a different color) the remote vehicles 48 are capable of receiving and transmitting V2X communications. Then, the method 100 continues to block 106.

At block 106, the controller 34 receives an input from the vehicle occupant 15 of the host vehicle 10 through the user interface 23. This input is indicative that the vehicle occupant 15 wants to communicate a message, such as a prerecorded voice message, to one or more selected V2X-capable remote vehicles 48. The input includes a selection of one or more V2X-capable remote vehicles 48. To do so, the vehicle occupant 15 of the host vehicle 10 may use his finger to touch one or more icon representing the V2X-capable remote vehicles in the touchscreen 43 as shown in FIG. 3. Alternatively, the input may include a voice command from the vehicle occupant 15. In this case, the microphone 31 (FIG. 1) of the user interface 23 receives the voice command from the vehicle occupant 15. Then, the method 100 continues to block 108.

At block 108, the controller 34 of the host vehicle 10 receives another input from the vehicle occupant 15. In this case, the input includes a selection of one or more prerecorded voice (audible) messages. As shown in FIG. 4, the prerecorded voice messages may be shown in a dropdown menu 11 presented on the display 29 of the host vehicle 10. The vehicle occupant 15 may touch the touchscreen 43 to select a prerecorded voice message from the dropdown menu 11. As non-limiting examples, the dropdown menu 11 may include the following prerecorded voice messages, namely: "Thank you"; "Sorry"; "No problem"; "Turn off your high beam"; and "You are in reverse". Then, the method 100 proceeds to block 110.

At block 110, the controller 34 of the host vehicle 10 command the communication transceiver 37 to transmit the prerecorded voice message selected at block 108 to the V2X-capable remote vehicle 48 selected at block 106. In response, the selected V2X-capable remote vehicle 48 receives the selected prerecorded voice message. As a non-limiting example, the selected V2X-capable remote vehicle 48 may then convey the prerecorded voice message to the vehicle occupant 15 of the selected V2X-capable remote vehicle 48. As a non-limiting example, selected V2X-capable remote vehicle 48 may play the prerecorded voice message using one or more speakers 27. Alternatively, the prerecorded voice message may be converted into text and shown to the vehicle occupant 15 of the selected V2X-capable remote vehicle 48 via the display 29. Alternatively, the vehicle 10 sends text message, the remote vehicle 48 displays the text message and, as an alternative, converts the text message to voice and play to its occupants. Next, the method 100 continues to block 112.

At block 112, the vehicle occupant 15 of the V2X-capable remote vehicle 48 that received the prerecorded voice message may reply to the prerecorded voice message using the user interface 23 (via a voice command and/or touching the touch screen 43). In response, the controller 34 of the host vehicle 10 receives the reply (e.g., a voice reply) from the V2X-capable remote vehicle 48 that received the prerecorded voice message.

Figure 5:
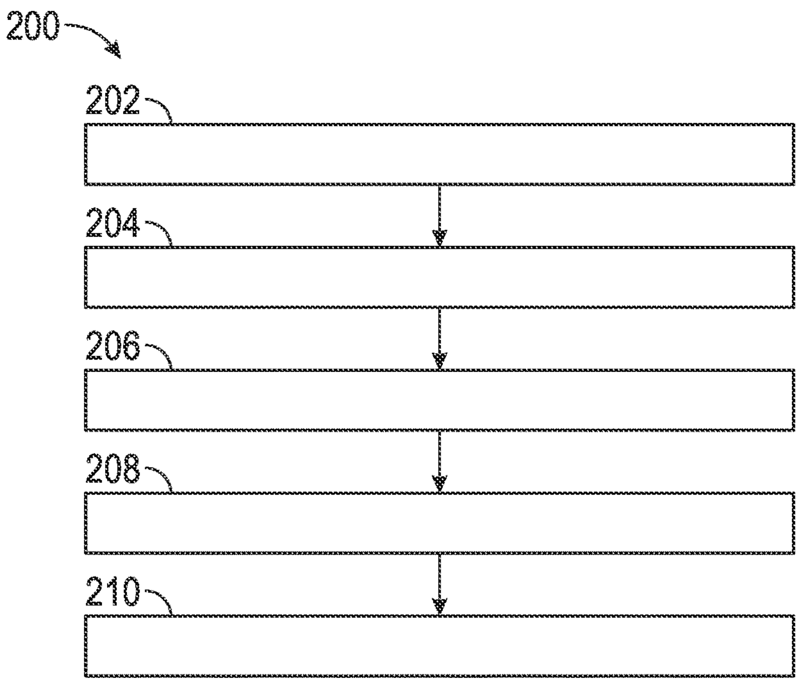
FIG. 5 is another method for driver-defined vehicle to vehicle communications.
Figure 6:
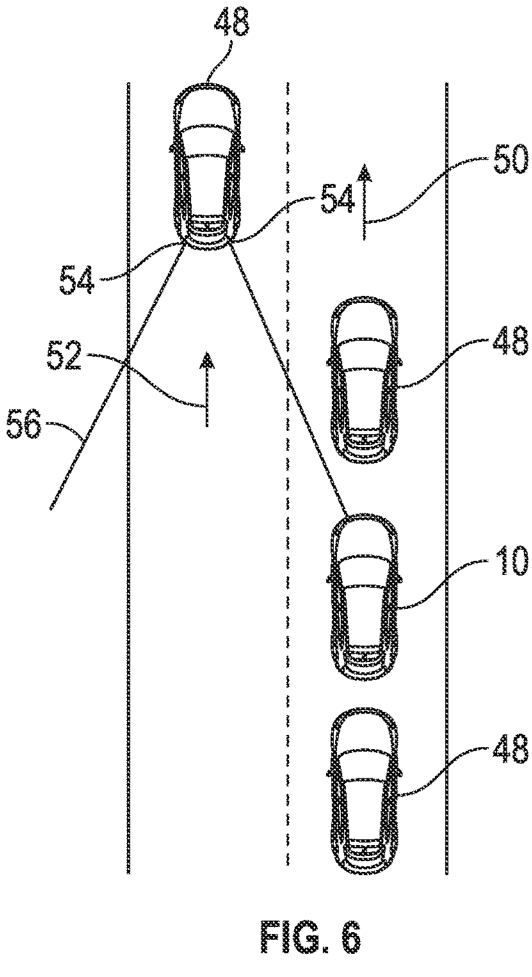

With reference to FIGS. 5 and 6, a method 200 for driver-defined vehicle to vehicle communications is disclosed. The method 200 may be combined with the method 100. Thus, the method 100 may include some or all of the steps of the method 200. The method 200 is used in a situation where the host vehicle 10 is moving in a first direction 50 and a V2X-capable remote vehicle 48 is moving in a second direction 52 toward the host vehicle 10. The second direction 52 is opposite the first direction 50. In this situation, the high-beam headlights 54 of the V2X-capable remote vehicle 48 are turned on. The method 200 begins at block 202. At block 202, the controller 34 of the host vehicle 10 detects detecting that the high-beam headlights 54 of the V2X-capable remote vehicle 48 that is moving toward the host vehicle 10 (in the second direction 54) are turned on using the sensor data from the sensors 40 (e.g., camera 41). Next, the method 200 continues to block 204.

At block 204, the controller 34 of the host vehicle 10 uses the sensors 40 (e.g., camera 41) to determine the luminous intensity of the light beam 56 emitted by the high-beam headlights 54 of the V2X-capable remote vehicle 48 that is moving toward the host vehicle 10. The controller 34 then compares the luminous intensity of the light beam 56 emitted by the high-beam headlights 54 of the of the V2X-capable remote vehicle 48 that is moving toward the host vehicle 10 with a predetermined intensity threshold. If the luminous intensity of the light beam 56 emitted by the high-beam headlights of the V2X-capable remote vehicle 48 that is moving toward the host vehicle 10 is not greater than the predetermined intensity threshold, then the method 200 ends. However, if the luminous intensity of the light beam 56 emitted by the high-beam headlights of the V2X-capable remote vehicle 48 that is moving toward the host vehicle 10 is greater than the predetermined intensity threshold, then the method 200 proceeds to block 206.

At block 206, the host vehicle 10 transmits a message to the remote vehicles 48 that are within a predetermined distance from the host vehicle 10. Specifically, the controller 34 command the communication transceiver 37 to automatically broadcast the message to some or all of the remote vehicles 48 that are within the predetermined distance from the host vehicle 10. Alternatively, the vehicle occupant 15 may instruct the host vehicle 10 through the user interface 23 to broadcast the message to some or all of the remote vehicles 48 that are within the predetermined distance from the host vehicle 10. The message includes a request that the high-beam headlight 54 of the remote vehicle 48 be turned off. Then, the method 200 continues to block 208.

At block 208, the remote vehicles 48 that are located within the predetermined distance from the host vehicle 10. Upon receipt of the message, each remote vehicle 38 individually decides whether the message broadcasted by the host vehicle 10 applies to them. To do so, each remote vehicle 45 considers its owns state (e.g., heading, light status of the high-beam headlights 54, relative position to the origin of the message, etc.). If the message broadcasted by the host vehicle 10 applies to a particular remote vehicle 10, then that particular remote vehicle 48 is deemed to be the target remote vehicle 48. Then, the method 200 continues to block 210.

At block 210, the target remote vehicle 10 either automatically turns off the high-beam headlights 54 or target remote vehicle 48 sends in-cabin notification requesting that the high-beam headlights 54 be turned off. This block solely applies to the target remote vehicle 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for vehicle-to-vehicle communication, comprising:

receiving, by a controller of a host vehicle, remote-vehicle data from a plurality of remote vehicles, wherein each of the plurality of remote vehicles is located within a predetermined distance from the host vehicle, wherein the remote-vehicle data includes information relating to which of the plurality of remote vehicles is configured to receive and transmit Vehicle-to-Everything (V2X) communications;

identifying, by the controller of the host vehicle, at least one V2X-capable remote vehicle of the plurality of remote vehicles using the remote-vehicle data, wherein the at least one V2X-capable remote vehicle is capable of receiving and transmitting V2X communications;

maintaining, by the controller, a list of the V2X-capable remote vehicles identified from the remote-vehicle data, the list being used by the controller to identify and provide candidate V2X-capable remote vehicles for message transmission;

in response to identifying at least one V2X-capable remote vehicle, receiving, by a user interface of the host vehicle, an input from a vehicle occupant of the host vehicle, wherein the input is indicative that the vehicle occupant wants to communicate a prerecorded voice message to at least one V2X-capable remote vehicle; and in response to receiving the input from the vehicle occupant, transmitting the prerecorded voice message to the at least one V2X-capable remote vehicle via a V2X communication system of the host vehicle comprising V2X-configured transceivers.

2. The method of claim 1, further comprising broadcasting a service announcement message to the plurality of remote vehicles, wherein the service announcement message indicates that the host vehicle supports V2X communications.

3. The method of claim 1, wherein the input from the vehicle occupant is a voice command from the vehicle occupant, and the user interface of the host vehicle includes a microphone configured to receive the voice command from the vehicle occupant.

4. The method of claim 1, wherein the user interface includes a touchscreen, and the input from the vehicle occupant occurs when the vehicle occupant touches the touchscreen.

5. The method of claim 1, wherein the at least one V2X-capable remote vehicle is a first V2X-capable remote vehicle of a plurality of V2X-capable remote vehicles, and the input includes a selection of one of the plurality of V2X-capable remote vehicles.

6. The method of claim 5, wherein the user interface includes a display, the display includes a touchscreen, the prerecorded voice message is a first prerecorded voice message of a plurality of prerecorded voice messages, the input includes a selection of the first prerecorded voice message of the plurality of prerecorded voice messages, wherein the plurality of prerecorded voice messages is shown in a dropdown menu presented on the display of the host vehicle.

7. The method of claim 1, wherein the at least one V2X-capable remote vehicle plays the prerecorded voice message in response to receiving the prerecorded voice message from the host vehicle.

8. The method of claim 1, further comprising receiving a voice reply from the at least one V2X-capable remote vehicle to the prerecorded voice message.

9. A method for vehicle-to-vehicle communication, comprising:

detecting that a high-beam headlight of a remote vehicle that is moving toward a host vehicle is turned on by detecting, via a sensor system of the host vehicle, a luminous intensity emitted by the high-beam headlight and determining that the high-beam headlight is on based on the luminous intensity exceeding a predetermined intensity threshold;

determining, via a V2X communication system of the host vehicle, that the remote vehicle is moving toward the host vehicle based on V2X-received position and heading data;

in response to detecting that the high-beam headlight of the remote vehicle that is moving toward the host vehicle is turned on, transmitting a message to the remote vehicle, wherein the message includes a request that the high-beam headlight of the remote vehicle be turned off, the transmitting being performed via a V2X-configured transceiver of the host vehicle's V2X communication system.

10. The method of claim 9, further comprising automatically turning off the high-beam headlight of the remote vehicle in response to receiving the message requesting that the high-beam headlight be turned off.

11. The method of claim 9, further comprising:

determining a luminous intensity of a light beam emitted by the high-beam headlight of the remote vehicle that is moving toward the host vehicle;

comparing the luminous intensity of the light beam emitted by the high-beam headlight of the remote vehicle that is moving toward the host vehicle with a predetermined intensity threshold to determine whether the luminous intensity of the light beam emitted by the high-beam headlight of the remote vehicle that is moving toward the host vehicle is greater than the predetermined intensity threshold; and in response to determining that the luminous intensity of the light beam emitted by the high-beam headlight of the remote vehicle that is moving toward the host vehicle is greater than the predetermined intensity threshold, transmitting the message to the remote vehicle.

12. The method of claim 11, wherein the remote vehicle is a first remote vehicle of a plurality of remote vehicles, each of the plurality of remote vehicles is located within a predetermined distance from the host vehicle, the high-beam headlight of a plurality of high-beam headlights, each of the plurality of remote vehicles includes at least one of the plurality of high-beam headlights, transmitting the message to the remote vehicle includes broadcasting to the plurality of remote vehicles, and the method further comprises determining, by each of the plurality of remote vehicles, whether the message broadcasted by the host vehicle individually applies to each of a corresponding one of the plurality of remote vehicles to determine a target remote vehicle.

13. The method of claim 12, wherein solely the target remote vehicle sends in-cabin notification requesting that the plurality of high-beam headlights be turned off.

14. The method of claim 12, wherein solely the target remote vehicle automatically turns off the plurality of high-beam headlights in response to receiving the message broadcasted by the host vehicle.

15. A system for vehicle-to-vehicle communication, comprising:

a user interface;

a transceiver;

a controller in communication with the user interface and the transceiver, wherein the controller is programmed to:

receive remote-vehicle data from a plurality of remote vehicles, wherein each of the plurality of remote vehicles is located within a predetermined distance from a host vehicle, wherein the remote-vehicle data includes information as to which of the plurality of remote vehicles is configured to receive and transmit Vehicle-to-Everything (V2X) communications;

identify at least one V2X-capable remote vehicle of the plurality of remote vehicles using the remote-vehicle data, wherein the at least one V2X-capable remote vehicle is capable of receiving and transmitting V2X communications;

maintain a list of the V2X-capable remote vehicles identified from the remote-vehicle data, the list being used by the controller to identify and provide candidate V2X-capable remote vehicles for message transmission;

in response to identifying at least one V2X-capable remote vehicle, receive an input from a vehicle occupant of the host vehicle through the user interface, wherein the input is indicative that the vehicle occupant wants to communicate a prerecorded voice message to the at least one V2X-capable remote vehicle; and in response to receiving the input from the vehicle occupant, command the transceiver to transmit the prerecorded voice message to the at least one V2X-capable remote vehicle via a V2X communication system of the host vehicle comprising V2X-configured transceivers.

16. The system of claim 15, wherein the controller is programmed to command the transceiver to broadcast a service announcement message to the plurality of remote vehicles, and the service announcement message indicates that the host vehicle supports V2X communications.

17. The system of claim 15, wherein the input from the vehicle occupant is a voice command from the vehicle occupant, and the user interface of the host vehicle includes a microphone configured to receive the voice command from the vehicle occupant.

18. The system of claim 15, wherein the user interface includes a touchscreen, and the input from the vehicle occupant occurs when the vehicle occupant touches the touchscreen.

19. The system of claim 15, wherein the at least one V2X-capable remote vehicle is a first V2X-capable remote vehicle of a plurality of V2X-capable remote vehicles, and the input includes a selection of one of the plurality of V2X-capable remote vehicles.

20. The system of claim 19, wherein the user interface includes a display, the display includes a touchscreen, the prerecorded voice message is a first prerecorded voice message of a plurality of prerecorded voice messages, the input includes a selection of the first prerecorded voice message of the plurality of prerecorded voice messages, wherein the plurality of prerecorded voice messages is shown in a dropdown menu presented on the display of the host vehicle.

* * * * *